(12) United States Patent
LaLinde et al.

(10) Patent No.: US 9,747,485 B2
(45) Date of Patent: Aug. 29, 2017

(54) ARRANGEMENT FOR AND METHOD OF CLEANING A PLATTER OF A PRODUCT CHECKOUT WORKSTATION

(71) Applicant: SYMBOL TECHNOLOGIES, LLC, Lincolnshire, IL (US)

(72) Inventors: Paul LaLinde, Mastic, NY (US); Darran Michael Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 13/863,795

(22) Filed: Apr. 16, 2013

(65) Prior Publication Data

US 2014/0306009 A1    Oct. 16, 2014

(51) Int. Cl.
  *B65D 43/02*    (2006.01)
  *G06K 7/10*    (2006.01)
  *G07G 1/00*    (2006.01)

(52) U.S. Cl.
  CPC ........... *G06K 7/1098* (2013.01); *B65D 43/02* (2013.01); *G06K 7/1096* (2013.01); *G07G 1/0018* (2013.01); *G07G 1/0045* (2013.01); *B65D 2543/00916* (2013.01)

(58) Field of Classification Search
  CPC ....................... B65D 43/02; B65D 2543/00916
  USPC .............................. 235/440, 462.43; 220/282
  See application file for complete search history.

(56) References Cited

U.S. PATENT DOCUMENTS

| | | | |
|---|---|---|---|
| 2,026,463 A * | 12/1935 | Driess | B65D 43/0212 220/282 |
| 3,995,766 A * | 12/1976 | Fralick | 220/282 |
| 4,377,236 A * | 3/1983 | Montgomery | 206/540 |
| 4,971,377 A | 11/1990 | Aquilante | |
| 5,029,723 A * | 7/1991 | Lo | 220/282 |
| 5,086,879 A | 2/1992 | Latimer et al. | |
| 5,410,108 A | 4/1995 | Williams et al. | |
| 6,182,387 B1 * | 2/2001 | Duguay | G09F 7/04 40/600 |
| RE40,071 E | 2/2008 | Svetal et al. | |
| 7,491,905 B2 | 2/2009 | Jwo | |
| 7,681,795 B2 | 3/2010 | Roquemore | |
| 8,113,431 B2 | 2/2012 | Gregerson | |

(Continued)

FOREIGN PATENT DOCUMENTS

| | | |
|---|---|---|
| EP | 0534641 | 12/1995 |
| WO | 2010/129786 A2 | 11/2010 |

OTHER PUBLICATIONS

PCT International Search report dated Sep. 4, 2014 counterpart of PCT/US2014/031843.

*Primary Examiner* — Toan Ly
(74) *Attorney, Agent, or Firm* — Yuri Astvatsaturov (57) ABSTRACT

A checkout workstation includes a generally planar platter having a contact region, a generally horizontal window integrated with the platter, a data capture arrangement for capturing through the horizontal window a target associated with a product to identify the product being checked out at the workstation, and a support structure for supporting the platter in a generally horizontal plane on a plurality of bottom supports during product checkout. The bottom supports are asymmetrically mutually arranged about a periphery of the platter to enable the platter to tilt to a tilted plane that is inclined relative to the horizontal plane when a downward force is exerted on the contact region of the platter for cleaning the horizontal window.

15 Claims, 4 Drawing Sheets

(56) References Cited

U.S. PATENT DOCUMENTS

| 8,356,749 B2 | 1/2013 | Olmstead et al. |
| 2002/0005301 A1 | 1/2002 | Rehm |
| 2009/0020612 A1* | 1/2009 | Drzymala .......... G06K 7/10811 235/462.32 |
| 2009/0078775 A1 | 3/2009 | Giebel et al. |
| 2012/0038480 A1 | 2/2012 | Friend et al. |

* cited by examiner

ARRANGEMENT FOR AND METHOD OF CLEANING A PLATTER OF A PRODUCT CHECKOUT WORKSTATION

FIELD OF THE DISCLOSURE

The present disclosure relates generally to a point-of-transaction checkout workstation through which products bearing electro-optically readable targets are passed by a user, and, more particularly, to an arrangement for, and a method of, cleaning a platter of the workstation by tilting and removing the platter from the workstation, especially without the aid of any tools.

BACKGROUND

In the retail industry, flat bed or horizontal slot scanners, each having a single horizontal window, and bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks, and/or at self-service, point-of-transaction checkout systems operated by customers, in supermarkets, warehouse clubs, department stores, and other kinds of retailers, for many years. Products to be purchased bear, or are associated with, identifying target symbols and are typically slid by a user across a scanner window, e.g., from right to left, or from left to right, in a "swipe" mode, to a bagging area. Alternatively, the user merely presents the target symbol on, or associated with, the product to, and holds the product momentarily steady at, a central region of a scanner window in a "presentation" mode, prior to placing the product in the bagging area. The choice depends on the type of target, on user preference, and on the layout of the system.

Some checkout systems include laser-based workstations, and project a multitude of laser scan lines through a scanner window. When at least one of the scan lines sweeps over a target symbol associated with a product, the symbol is processed, decoded and read, thereby identifying the product and enabling information, such as the product's price, to be retrieved from a price database. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the scanner window as a scan pattern of the laser scan lines.

Other checkout systems include imager-based workstations, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a scanner window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being electro-optically read, e.g., decoded data identifying the product and enabling information, such as the product's price, to be retrieved from a price database, or into a picture of a target other than a symbol.

Each of such laser-based workstations and imager-based workstations are provided with a generally planar platter or platform, in which the abovementioned horizontal window is typically integrated. During checkout, some products are placed on, and swiped and slid across, the platter. Some of these workstations include a scale for weighing products that are sold on the basis of weight. For example, many fruits, vegetables, meats, cheeses, nuts, fish, bakery items, candies, etc. are offered for sale in a quantity selected by the customer, and the total price of such loose products depends upon the total weight of the selected quantity. The platter is typically in a force-transmitting relationship with the workstation scale. During checkout, products to be weighed are placed on the platter so that the scale can measure the product weight. Once the product is identified by reading its target, its unit weight price is retrieved from a price database, and the total price is calculated based on the unit weight price and the weight measured by the scale.

However, as advantageous as the use of such platters has been, either with or without a scale, one concern relates to cleaning them, especially their integrated horizontal windows. The checkout system environment can be quite dusty and dirty. Products successively placed on, and swiped and slid past, the horizontal window on the platter can shed pieces thereof, or can spill, and will therefore contaminate the platter. A contaminated window may not meet recommended reading guidelines. In extreme cases, a non-clean window may slow reading, or may even prevent reading from occurring. Periodic, and frequent, cleaning of the platter are therefore essential, especially in a food environment where hygiene and sanitary conditions are paramount.

It is known to remove platters from their workstations for cleaning by using tools. However, tools may not always be available. Tools also require a certain amount of skill and time. Certain retail store personnel may not have sufficient time or requisite skills to handle tools and remove the platters. Complicating the removal procedure is the fact that many workstations are built into retail counters such that the platters are generally flush with countertops of the retail counters, and further that these platters are at least partly and closely surrounded by frames. Although the closely surrounding frames prevent dust and dirt from entering the workstations, very little room is provided between the frames and the platters for a user to insert a removal tool. As a result, even with tools, removal of the platter is a cumbersome process, which frequently results in the user's hands being cut.

Accordingly, there is a need to easily and rapidly remove a platter from, a workstation, without the aid of tools, for cleaning purposes.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a checkout workstation that includes a generally planar platter having a contact region, a generally horizontal window integrated with the platter, a data capture arrangement for capturing through the horizontal window a target associated with a product to identify the product being checked out at the workstation, and a support structure for supporting the platter in a generally horizontal plane on a plurality of bottom supports during product checkout. The bottom supports are asymmetrically mutually arranged about a periphery of the platter to enable the platter to tilt to a tilted plane that is inclined relative to the horizontal plane when a downward force is exerted on the contact region of the platter for cleaning the horizontal window.

Advantageously, the workstation is a bi-optical workstation that has another upright window located in a generally upright plane that intersects the generally horizontal plane. The data capture arrangement preferably includes at least one solid-state imager for capturing through at least one of the windows an image of the target, and a microprocessor operatively connected to the at least one imager for processing the image of the target.

In a preferred embodiment, the platter is generally rectangular and has four corner regions, and the contact region is one of the corner regions. There are advantageously four bottom supports. Three of the bottom supports are located in three of the corner regions, and a fourth of the bottom supports is located remotely away from a fourth of the corner regions. Preferably, the platter has one side supported by a first set of the bottom supports, and an opposite side supported by a second set of the bottom supports. At least one bottom support of the first set is offset relative to at least one bottom support of the second set.

A method of cleaning a window integrated with a generally planar platter of a product checkout workstation, in accordance with another aspect of this disclosure, is performed by supporting the platter in a generally horizontal plane on a plurality of bottom supports during product checkout, asymmetrically mutually arranging the bottom supports about a periphery of the platter, and exerting a downward force on a contact region of the platter to enable the platter to tilt to a tilted plane that is inclined relative to the horizontal plane. Once tilted, the platter can be entirely removed from the workstation to clean the window. No tools are employed.

Figure 1:
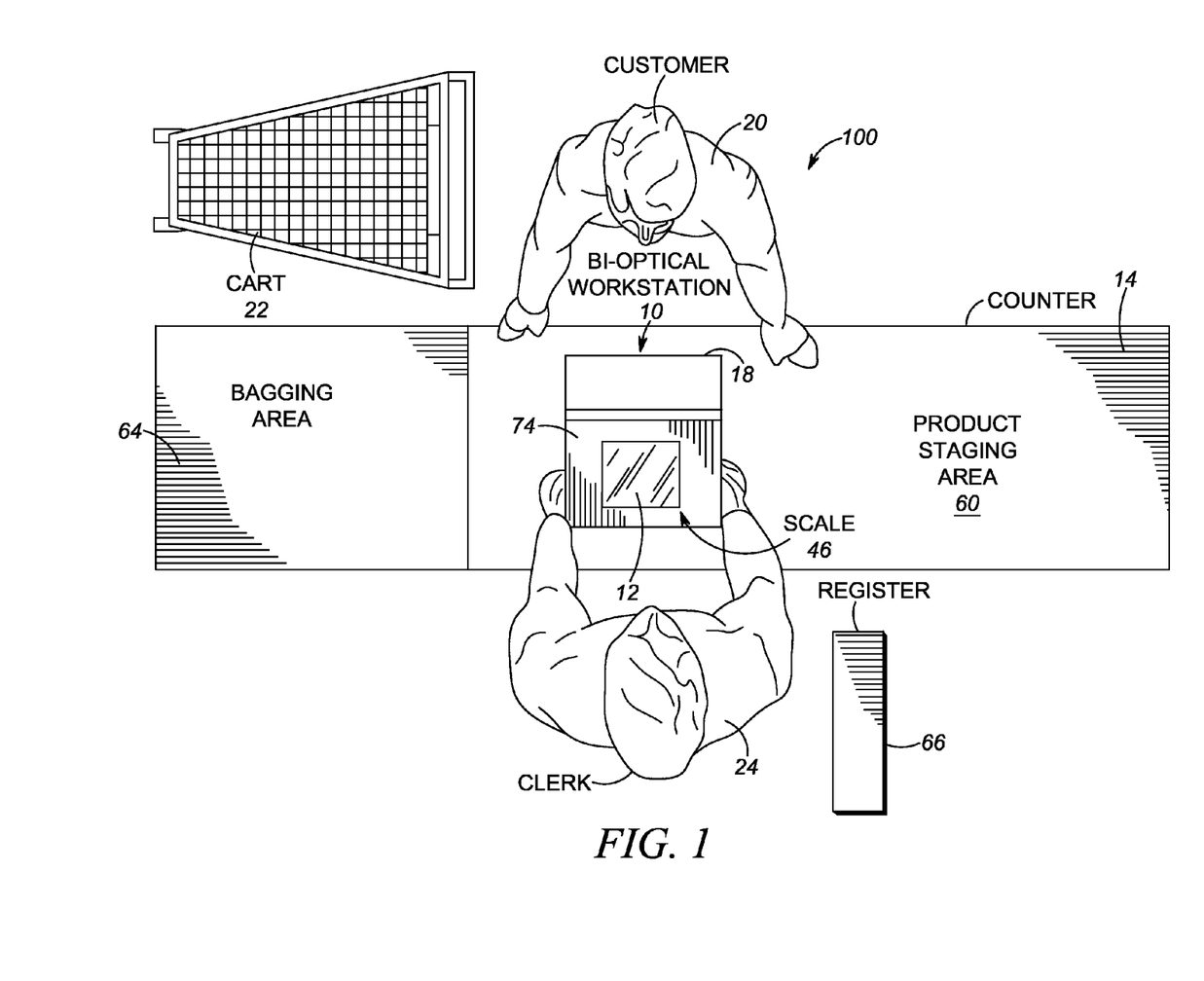
FIG. 1 is a top plan view of a checkout system for processing products associated with targets electro-optically readable at a workstation having a platter to be removed and cleaned in accordance with this disclosure.
Figure 2:
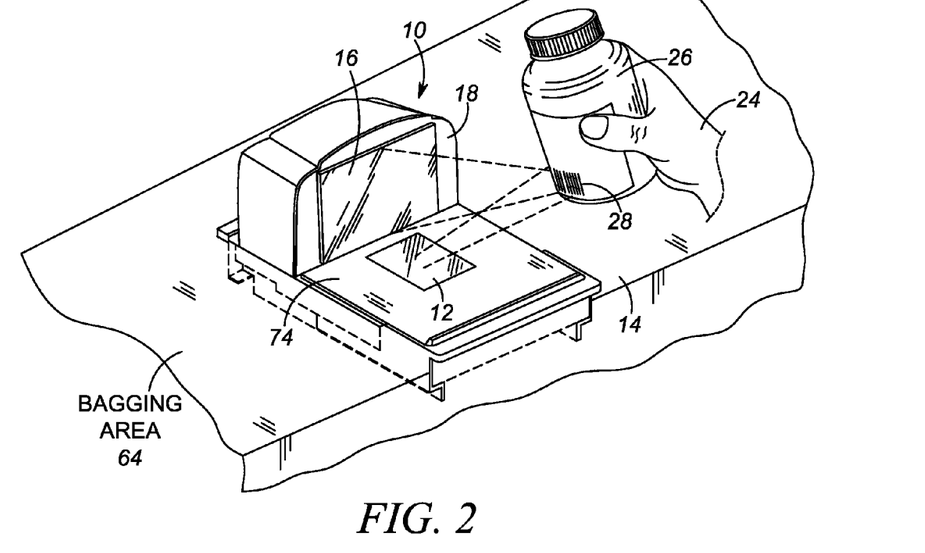
FIG. 2 is a broken-away perspective view of the system of FIG. 1 during reading.
Figure 3:
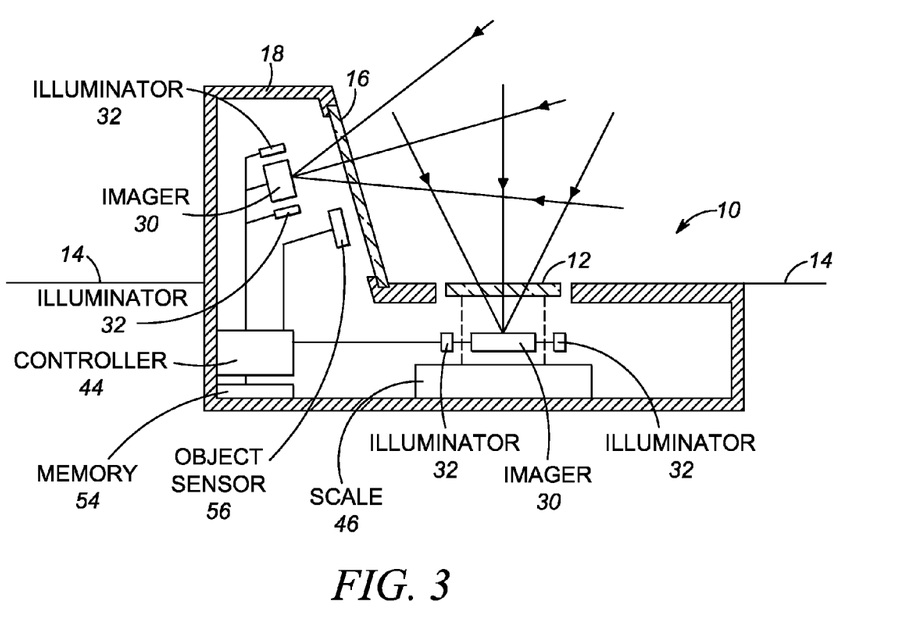
FIG. 3 is a schematic diagram of various components of the workstation of FIG. 1.

Turning now to the drawings, a checkout system 100, as depicted in FIG. 1, includes a dual window, bi-optical, point-of-transaction workstation 10 used by retailers at a checkout counter to process transactions involving the purchase of products 26 (see FIG. 2) bearing an identifying target, such as the UPC symbol 28 described above. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or preferably, as shown in FIGS. 2-3, rests in a cutout or well formed in the counter. As described below, the window 12 is integrated and coplanar with a generally horizontal, planar platform or platter 74.

Returning to FIG. 1, both of the windows 12, 16 are positioned to face and be accessible to a clerk 24 standing at one side of the counter for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As schematically shown in FIG. 3, a data capture arrangement, advantageously including a plurality of imaging readers, each including a solid-state imager 30 and an illuminator 32, is mounted at the workstation 10, for capturing light passing through either or both windows 12, 16 from a target that can be a one- or two-dimensional symbol, such as a two-dimensional symbol on a driver's license, or any document. Each imager 30 is a solid-state area array, preferably a CCD or CMOS array. Each imager 30 preferably has a global shutter. Each illuminator 32 is preferably one or more light sources, e.g., one or more surface-mounted, light emitting diodes (LEDs), located at each imager 30 to uniformly illuminate the target.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The product 26 can also be momentarily placed on, and/or slid or swiped across, the platter 74. The target 28 may be located on any of the top, bottom, right, left, front and rear, sides of the product, and at least one, if not more, of the imagers 30 will capture the illumination light reflected, scattered, or otherwise returning from the target through one or both windows as an image.

FIG. 3 also schematically depicts that a weighing scale 46 can be mounted at the workstation 10. The platter 74 is in a force-transmitting relationship with the weighing scale 46. Any product to be weighed can also be momentarily placed on, and/or slid or swiped across, the platter 74 during weighing.

As schematically shown in FIG. 3, an object sensor 56 is also mounted at the workstation 10 for detecting when each product 26 enters and exits the workstation 10. The object sensor 56 may advantageously include two pairs of infrared (IR) light emitting diode (LED) emitters and IR detectors. The imagers 30, the associated illuminators 32, and the object sensor 56 are operatively connected to a programmed workstation microprocessor or controller 44 operative for controlling the operation of these and other components. Preferably, the microprocessor 44 is tasked with processing the return light scattered from each target 28, and with decoding the captured target image of the return light. A memory 54 is operatively bidirectionally connected to the microprocessor 44.

In operation, an active mode for the microprocessor 44 is initiated when the object sensor 56 detects that a product 26 has entered the workstation 10. The microprocessor 44 then sends successive command signals to the illuminators 32 to pulse the LEDs for a short time period of 300 microseconds or less, and successively energizes the imagers 30 to collect light from the target 28 only during said time period, also known as the exposure time period. By acquiring a target image during this brief time period, the image of the target 28 is not excessively blurred even in the presence of relative motion between the imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the microprocessor 44 has successfully decoded the target 28 and identified the product 26.

Figure 4:
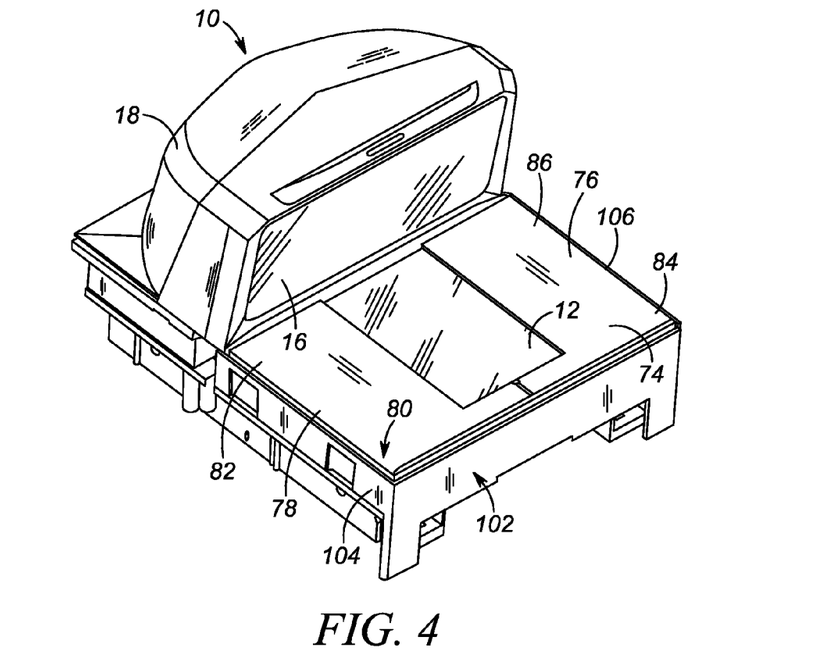
FIG. 4 is a perspective view of a practical embodiment of the workstation of FIGS. 1-3 in isolation.
Figure 5:
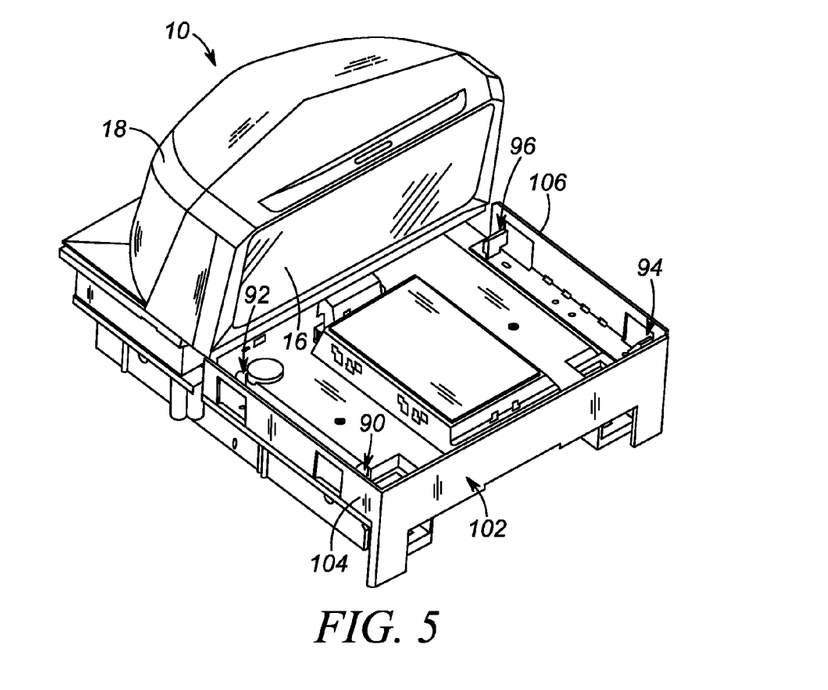
FIG. 5 is a view analogous to FIG. 4, but with the platter removed.

As shown in a practical embodiment depicted in FIG. 4, the platter 74 is generally rectangular and has four corner regions 80, 82, 84, 86. As shown in FIG. 5, a support structure, which includes a plurality of bottom supports 90, 92, 94, 96 at the same elevation, is operative for supporting the platter 74 from below in a generally horizontal plane during product checkout. Bottom supports 92, 94, 96 are respectively located in corner regions 82, 84, 86. However, bottom support 90 is not located in corner region 80, but instead, is located remotely therefrom, for the removal and cleaning purpose described below. As illustrated, the rectangular platter 74 has a right side 76 supported by a first set of the bottom supports 94, 96, and an opposite left side 78 supported by a second set of the bottom supports 90, 92. The bottom support 90 of the first set is offset relative to the bottom support 94 of the second set, i.e., the bottom supports 90, 94 are not collinear, although the bottom supports 92, 96 are collinear.

As illustrated in FIG. 5, the bottom supports 90, 92, 94, 96 are asymmetrically mutually arranged about a periphery of the platter 74. A frame 102 partly and closely surrounds the periphery of the platter 74. The frame 102 has one side wall 104 from which the bottom supports 90, 92 are stamped out, and an opposite side wall 106 from which the bottom supports 94, 96 are stamped out. The bottom supports 90, 92, 94, 96 are thus integral with the frame 102.

Figure 6:
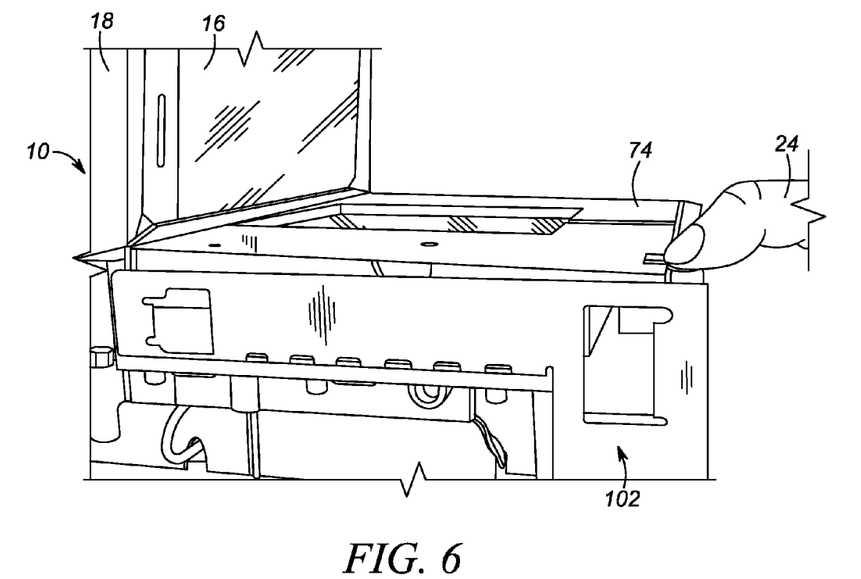
FIG. 6 is a broken-away, enlarged perspective view of the workstation of FIG. 5 at the beginning of the cleaning process.
Figure 7:
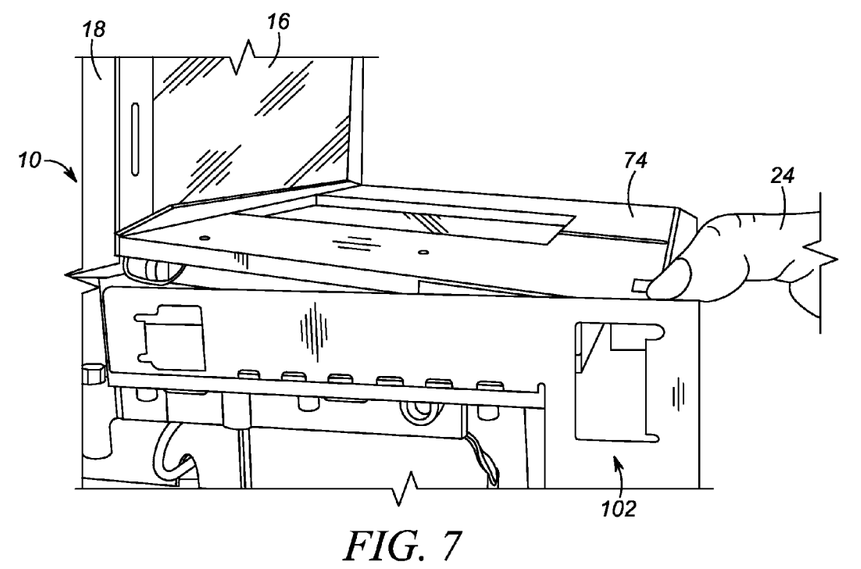
FIG. 7 is a view analogous to FIG. 6, but at a later stage of the cleaning process with the platter tilted.

In order to clean the window 12, the user 24 first places his or her finger on the corner region 80 (also called the contact region) of the platter 74, as shown in FIG. 6. Thereupon, as shown in FIG. 7, the user 24 exerts a downward force on the contact region 80 until the platter 74 tilts into a tilted plane that is inclined relative to the horizontal plane. This action raises the corner region 92 to an elevation sufficient for the user 24 to grab the tilted platter 74 and remove the latter completely from the workstation. Once the platter 74 has been entirely removed, both major surfaces of the platter 74, as well as both major surfaces of the window 12, can now be cleaned. No tools have been used. The user's hands have been protected from being cut. Removal of the platter 74 is easy and rapid.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the workstation 10 need not be configured as a bi-optical workstation, but could instead be configured as a flat bed or horizontal slot scanner having a single horizontal window. The workstation 10 need not be imager-based, but could instead be laser-based. An imager-based workstation need not have the configuration depicted in FIG. 3, but instead could have one or more imagers, each having a field of view split by optical splitters and by a plurality of fold mirrors into a plurality of subfields for greater coverage.

As further examples, the contact region need not the corner region 80, but could be located at any of the other corner regions. Also, the number of bottom supports need not be four, but can be three, in which case, two of the bottom supports could be located in the positions shown for the bottom supports 94, 96, and the third bottom support could be located midway between the positions shown for the bottom supports 90, 92. Other asymmetric arrangements for the bottom supports are contemplated and intended to be included within the scope of this invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A checkout workstation, comprising:
    a platter primarily disposed in a single plane and having a contact region;
    a window integrated and coplanar with the platter;
    a data capture arrangement for capturing through the window a target associated with a product to identify the product being checked out at the workstation; and
    a support structure for supporting the platter in a generally horizontal plane on a plurality of bottom supports during product checkout, the bottom supports being asymmetrically mutually arranged about a periphery of the platter to enable the platter to tilt to a tilted plane that is inclined relative to the horizontal plane when a downward force is exerted on the contact region of the platter for cleaning the horizontal window, wherein the contact region is in one of a plurality of corner regions, such that when the downward force is exerted on the contact region to tilt the platter to the tilted plane, an opposite corner region is raised to an elevation sufficient for the platter to be removed from the checkout workstation,
    wherein the platter has one side supported by a first set of the bottom supports and an opposite side supported by a second set of the bottom supports, and wherein at least one bottom support of the first set is collinear with at least one bottom support of the second set and at least another bottom support of the first set is non-collinear with at least another bottom support of the second set, the contact region on which the downward force is exerted to tilt the platter being disposed remotely away from the at least another bottom support of the first set that is non-collinear with the at least another bottom support of the second set corresponding to the opposite side of the platter.

2. The workstation of claim 1, and an upright window located in a generally upright plane that intersects the generally horizontal plane; and wherein the data capture arrangement includes at least one solid-state imager for capturing through at least one of the windows an image of the target, and a microprocessor operatively connected to the at least one imager for processing the image of the target.

3. The workstation of claim 1, and a scale in force-transmitting relationship with the platter for weighing the product at the workstation.

4. The workstation of claim 1, wherein the platter is generally rectangular and has four corner regions, and wherein the contact region is one of the four corner regions.

5. The workstation of claim 4, wherein there are four bottom supports, wherein three of the bottom supports are located in three of the four corner regions, and wherein a fourth of the bottom supports is located remotely away from a fourth of the four corner regions.

6. The workstation of claim 1, wherein the support structure includes a frame that at least partially surrounds the periphery of the platter, and wherein the bottom supports are integral with the frame.

7. The workstation of claim 1, wherein all bottom supports in the second set of the bottom supports and the at least one bottom support of the first set are disposed below respective corner regions of the platter while the at least another bottom support of the first set of bottom supports is disposed remotely away from the corner region corresponding to the contact area of the platter.

8. A checkout bi-optical workstation, comprising:
a rectangular platter primarily disposed in a single plane and having four corner regions;
a window integrated and coplanar with the platter and lying in a generally horizontal plane;
an upright window located in a generally upright plane that intersects the generally horizontal plane;
a data capture arrangement for capturing through at least one of the windows a target associated with a product to identify the product being checked out at the workstation; and
a support structure for supporting the platter in the generally horizontal plane on a plurality of bottom supports during product checkout, the bottom supports being asymmetrically mutually arranged about a periphery of the platter to enable the platter to tilt to a tilted plane that is inclined relative to the horizontal plane when a downward force is exerted on a contact region in one of the four corner regions of the platter for cleaning the horizontal window, wherein when the downward force is exerted on the contact region to tilt the platter to the tilted plane, an opposite corner region is raised to an elevation sufficient for the platter to be removed from the checkout bi-optical workstation,
wherein the platter has one side supported by a first set of the bottom supports and an opposite side supported by a second set of the bottom supports, and wherein at least one bottom support of the first set is collinear with at least one bottom support of the second set and at least another bottom support of the first set is non-collinear with at least another bottom support of the second set, the contact region on which the downward force is exerted to tilt the platter being disposed remotely away from the at least another bottom support of the first set that is non-collinear with the at least another bottom support of the second set corresponding to the opposite side of the platter.

9. The workstation of claim 8, wherein there are four bottom supports, wherein three of the bottom supports are located in three of the four corner regions, and wherein a fourth of the bottom supports is located remotely away from a fourth of the four corner regions.

10. A method of cleaning a window integrated with a generally planar platter of a product checkout workstation, the method comprising:
providing a platter of a product checkout workstation, wherein the platter is supported in a generally horizontal plane on a plurality of bottom supports during product checkout, the platter being primarily disposed in a single plane;
asymmetrically mutually arranging the bottom supports about a periphery of the platter so that the platter is configured to tilt to a tilted plane that is inclined relative to the horizontal plane upon receiving a downward force on a contact region of the platter, wherein the contact region is in one of a plurality of corner regions of the platter, such that when the downward force is exerted on the contact region to tilt the platter to the tilted plane, an opposite corner region is raised to an elevation sufficient for the platter to be removed from the checkout workstation; and
wherein the platter has one side supported by a first set of the bottom supports and an opposite side supported by a second set of the bottom supports, and wherein at least one bottom support of the first set is collinear with at least one bottom support of the second set and at least another bottom support of the first set is non-collinear with at least another bottom support of the second set, the contact region on which the downward force is exerted to tilt the platter being disposed remotely away from the at least another bottom support of the first set that is non-collinear with the at least another bottom support of the second set corresponding to the opposite side of the platter.

11. The method of claim 10, further comprising providing an upright window located in a generally upright plane that intersects the generally horizontal plane; and capturing through at least one of the windows an image of a target associated with a product to identify the product being checked out at the workstation, and processing the image of the target.

12. The method of claim 10, further comprising providing a scale in force-transmitting relationship with the platter.

13. The method of claim 10, further comprising configuring the platter with a generally rectangular shape having four corner regions, and configuring the contact region as one of the four corner regions.

14. The method of claim 13, wherein there are four bottom supports, and locating three of the bottom supports in three of the four corner regions, and remotely locating a fourth of the bottom supports away from a fourth of the four corner regions.

15. The method of claim 10, further comprising at least partially surrounding the periphery of the platter with a frame, and configuring the bottom supports as integral parts of the frame.

* * * * *